3,766,266
METHOD OF PRODUCING N-ACYL-ALPHA-AMINO ACIDS

Hachiro Wakamatsu and Jyunko Uda, Tokyo, and Nobuyuki Yamagami, Kawasaki, Japan, assignors to Ajinomoto Co., Inc., Tokyo, Japan
No Drawing. Filed Mar. 25, 1971, Ser. No. 128,164
Claims priority, application Japan, Apr. 4, 1970, 45/28,773
Int. Cl. C07c 99/00
U.S. Cl. 260—534 C
6 Claims

ABSTRACT OF THE DISCLOSURE

When an aldehyde is reacted with carbon monoxide and the amide of a carboxylic acid in the presence of a carbonylation catalyst, there is obatined the N-acyl derivative of an α-amino acid having one more carbon atom than the aldehyde used, the acyl group corresponding to that of the amide. The reactants may be formed in situ. Amino acids may be produced by hydrolyzing the N-acyl-α-amino acid.

---

This invention relates to the synthesis of N-acyl-α-amino acids, including oligopeptides.

It has been attempted to synthesize α-amino acids or derivatives thereby reacting a Schiff base or a nitrile with carbon monoxide and hydrogen, but the attempt failed [Bull. Chem. Soc. Japan 33 (1960) 78].

It has now been found that N-acyl-α-amino acids can be obtained when compounds providing a formyl group and a carbamoyl group having at least one active hydrogen atom are reacted with carbon monoxide in the presence of a carbonylation catalyst under carbonylation conditions. The reaction of this invention may be represented by the following formula:

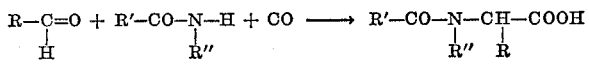

wherein R, R' and R'' may be hydrogen or organic radicals, R and R' may be portions of the same radical so that the product formed is cyclic.

Any aldehyde may be used in the method of the invention. More specifically, aliphatic, alicyclic, aromatic, and heterocyclic aldehyde have been used successfully in the method of the invention. Aldehydes giving good yields with suitable amides include formaldehyde, acetaldehyde, propionaldehyde, butyraldehyde, phenylacetaldehyde, 2,4-dihydroxyphenylacetaldehyde, indolylacetaldehyde, crotonaldehyde, β - formylpropionaldehyde, β-formylpropionic acid and its esters, β-methylmercaptopropionaldehyde, glycolaldehyde, α-acetoxypropionaldehyde, e-phthalimino-n-valeraldehyde, stearaldehyde, benzaldehyde, furfural, indolaldehyde, adipaldehyde, acrolein, and others which will partly become apparent as the disclosure proceeds.

The source of the carbamoyl group having at least one active hydrogen atom may be the amide of any carboxylic acid, more specifically, of any aliphatic, aromatic, alicyclic, or heterocyclic carboxylic acid. The number of carbon atoms and the structure of the amide are not critical. Cyclic amides are useful if they contain the carbamoyl group —CO—NH—.

Suitable amides thus include, but are not limited to, formamide, acetamide, glycinamide, phthalylglycine amide, N-alkylacetamides, N-acetylmethionine amide, pyrrolidonecarboxylic acid, 2-pyrrolidone, urea, benzamide, propionamide, lauramide, tartaric acid amide, aspartic acid amide, glutamic acid amide, L-leucine amide, L-pyrrolidonecarboxylic acid amide, acrylic amide, crotonamide, diacetamide, and the like. Amides identified as optically active are also effective in the form of other enantiomorphs or as racemates, and amides enumerated which may be optically active, but have not been so identified, are effective in both the optically active and inactive forms.

Compounds which contain both a formyl group and a carbamoyl group or monosubstituted carbamoyl group may be reacted with carbon monoxide to form cyclic amino acids. Such compounds include formalypropionamide, formylbutyramide, and formylcapronamide. The reaction product is a lactam carboxylic acid. Obviously, such compounds having dual functional groups may also be reacted with another aldehyde or another amide.

The formyl and/or carbamoyl groups may be formed in situ from suitable precursors in a preliminary reaction or simultaneously with the principal reaction by the effect of the carbon monoxide or of a secondary reactant. Thus aldehydes may be formed by the decomposition of polymers, such as paraldehyde or paraformaldehyde, of acetals, and the like. They may also be formed by hydrogenation or hydroformylation of precursors under the conditions of the reaction of this invention from acid anhydrides (see German Patent No. 2,016,061) or olefins, by isomerization of epoxides and the like.

The amides required for the reaction of the invention may be derived from the ammonium salts of the corresponding carboxylic acids or their nitriles, or from a corresponding ester by the action of ammonia.

The carbon monoxide employed need not satisfy particular purity requirements although catalyst poisons will be avoided if the reaction is intended to continue over an extended period. Hydrogen in a limited amount may be present, and tends to increase the rate of reaction and the yield of the desired N-acyl-α-amino acid when present in the carbon monoxide. Nitrogen, methane, and carbon dioxide, which are normal minor constituents of water gas, have no adverse effect on the reaction and such secondary gases may be employed for producing an aldehyde or amide from a precursor under reaction conditions.

The catalysts effective for the purposes of this invention are those known to be useful in carbonylation and hydrocarbonylation reactions and include the transition elements, more particularly the elements of the iron group (iron, cobalt, nickel) and the platinum metals (ruthenium, rhodium, palladium, osmium, iridium, and platinum). They may be supplied to the reaction zone in the metallic state, preferably finely dispersed, as carbonyls, or as salts or complexes which form the metals or the carbonyls under the reaction conditions. Better results are normally obtained when compounds containing phosphorus, nitrogen, oxygen, halogens, which are known cocatalysts for hydroformylation and carbonylation reactions are used as ligands.

The formyl and carbamoyl groups react in a 1:1 ratio, but the aldehydes and amides need not be present in the reaction mixture in such a ratio. It is normally most economical to have equivalent amounts of the aldehyde and amide present in the mixture, but an excess of amide may be used to increase the yield where the aldehyde is more costly and vice versa. The carbon monoxide is normally present in excess over the aldehyde and amide when gaseous carbon monoxide is supplied to the reaction zone, but such an excess is not required, and there is no upper limit to the amount of carbon monoxide which may be present in the reaction zone.

The amount of catalysts employed varies greatly with the metal used, but it is usually within the range of $10^{-1}$ to $10,000^{-1}$ moles per mole of the product formed. However, a metallic carbonyl, e.g., cobalt carbonyl, may be used in stoichiometric amounts relative to the formyl and carbamoyl groups also to provide carbon monoxide. The reaction in this instance may be performed at ambient temperature and pressure, but elevated pressures and temperatures are necessary and preferred under other conditions, as is conventional in many carbonylation and hydrocarbonylation reactions whose conditions should generally be maintained.

The reaction temperature, thus, is usually between 10° and 300° C., and reaction temperatures of 50° to 200° C. are most practical in most cases. If elevated pressure is resorted to, it should be within the range of 10 to 500 atmospheres, but, as mentioned above, an elevated pressure or an elevated temperature may not be necessary to produce carbonylation conditions with a suitable catalyst, and the upper limits of temperature and pressure are established by such extraneous consideration as the capability of the equipment used and the sensitivity of the reactants, of the catalyst and of the product.

The reaction may be carried out in a system consisting solely of a source of formyl groups, a source of carbamoyl groups having at least one active hydrogen atom, a carbonylation catalyst, and a source of carbon monoxide, the provision of a single compound capable of providing more than one component of the system not being excluded. It is usually preferred to perform the reaction in a system which includes a solvent as a diluent. The solvents normally employed in carbonylation and hydrocarbonylation reactions are also effective for this invention. The solvent may be the free acid whose amide provides the carbamoyl groups, or an ester of the acid. If an alcohol is present in the solvent, a corresponding ester of the N-acyl-α-amino acid is usually formed. Other secondary reactions may occur in the reaction medium to cause cyclisation or condensation of the primary reaction product.

If it is desired to recover the reaction product from the reaction mixture, it is normally preferred first to remove the catalyst and the solvent, if any. The recovery methods will be obvious to those skilled in the art from the nature of the specific product to be recovered.

Amino acids may be prepared by the method of the invention by hydrolysis of the N-acyl derivatives in an obvious manner.

The following examples further illustrate this invention.

EXAMPLE 1

2.2 g. acetaldehyde (50 millimoles), 3.0 g. acetamide (50 millimoles), 300 mg. dicobalt octacarbonyl $Co_2(CO)_8$, and 50 ml. dioxane were placed in a 100 ml. stainless steel pressure vessel equipped with an electromagnetic stirrer which was then charged to a gas pressure of 160 kg./cm.$^2$ with a mixture of 15 volumes carbon monoxide and one volume hydrogen.

The contents of the vessel were stirred at 120° C. for 40 minutes, whereby 44 millimoles of the gas were absorbed. The vessel was then cooled, the pressure was released, and a yellowish-brown, clear liquid was poured from the vessel. It was found to contain 40 milliequivalents of a carboxylic acid.

From an aliquot of the reaction mixture, the carboxylic acid was recovered by means of an anion exchange resin (Amberlite IR-4B), and the material recovered by elution was identified as N-acetylalanine by elementary analysis, melting point, and infrared spectrum.

The solvent was distilled from the remainder of the reaction mixture, and the residue was refluxed with 8 N hydrochloric acid for three hours. The hydrolyzate so obtained was passed in part over a cation exchange resin (Amberlite IR-120), and pure alanine was eluted from the resin and identified by its infrared spectrum, melting point, elementary analysis, and thin layer chromatography.

The alanine content of the hydrolyzate was determined by gas chromatography after treating wtih bis(trimethylsilyl)acetamide. 38.8 millimoles were found corresponding to a 94% yield based on the acetamide consumed.

EXAMPLE 2

In a manner closely analogous to the procedure of Example 1, 50 millimoles each of aldehyde and amide were reacted in the presence of dicobalt octacarbonyl with a mixture of three volumes of carbon monoxide and one volume of hydrogen at an initial pressure of 200 kg./cm.$^2$. The aldehydes, amides, and solvents reacted, the reaction temperature, the reaction product and its melting point, and the yield in millimoles are listed in Table 1. In the table, the amides are identified by capital letters as follows: A, acetamide; F, formamide; B, benzamide; L, lauramide. The solvents are identified by numbers: 1, dioxane; 2, acetic acid; 3, ethylacetate.

TABLE 1

| Aldehyde | Amide/solvent | Temp., °C. | Product | M.P., °C. | Yield, mmole |
|---|---|---|---|---|---|
| Formaldehyde | A/1 | 110 | N-acetylglycine | 294/5 | 12.4 |
| Propionaldehyde | A/2 | 150 | N-acetyl-α-amino-n-butyric acid | 130/3 | 22.8 |
| i-Butyraldehyde | A/1 | 120 | N-acetylvaline | 145/7 | 35.1 |
| Phenylacetaldehyde | A/1 | 140 | N-acetylphenylalanine | 148/151.5 | 26.9 |
| β-Formylpropionic acid methyl ester | A/3 | 120 | N-acetylglutamic ac. methyl ester | 110/2 | 40.3 |
| β-Cyanopropionaldehyde | A/1 | 120 | N-acetyl-γ-cyano-α-aminobutyr. ac. | 115/121 | 29.4 |
| β-Methylmercaptopropionaldehyde | A/3 | 120 | N-acetylmethionine | 113.5/114.5 | 35.5 |
| Acetaldehyde | F/2 | 130 | N-formylalanine | 143/6 | 5.7 |
| Do | B/1 | 120 | N-benzoylalanine | 165/8 | 14.7 |
| Do | L/3 | 120 | N-lauroylalanine | 105/7 | 34.8 |
| i-Butyraldehyde | L/3 | 120 | N-lauroylvaline | 85/8 | 32.7 |
| β-Cyanopropionaldehyde | L/3 | 120 | N-lauroyl-γ-cyano-α-aminobutyr. acid | 55/7 | 34.2 |

EXAMPLE 3

The procedure of Example 2 was used in reacting α-acetoxypropionaldehyde and acetamide in ethyl acetate at 120° C. for 20 minutes, acetaldehyde and acrylamide in dioxane at 120° C. for 60 minutes, and acetaldehyde and nicotinamide in benzene at 160° C. for 15 minutes. The reaction mixtures were heated with hydrochloric acid as in Example 1, and the free amino acids were recovered, threonine, alanine, and again alanine being obtained in yields of 0.9, 4.0, and 2.0 millimoles respectively.

The acids were identified by their infrared spectra, NMR spectra, and by elementary analysis.

EXAMPLE 4

The afore-described pressure vessel was charged with 1.76 g. (40 millimoles) acetaldehyde, 7.6 g. (40 millimoles) acetylmethionine amide, 224 mg. dicobalt octacarbonyl, and 40 ml. ethyl acetate. A 3:1 mixture of carbon monoxide and hydrogen was forced into the vessel to raise the pressure to 200 kg./cm.$^2$.

The reaction mixture was stirred at 160° C. for 30 minutes, whereby 30.9 millimoles of the gas were absorbed. The reaction mixture removed from the vessel had a faint, yellowish-brown color and contained 13.6 milliequivalents of carboxylic acid. The solvent was removed, and a portion of the residue was hydrolyzed with 8 N hydrochloric acid for three hours.

Alanine and methionine were identified in the hydrolysis mixture by means of paper chromatography using a 4/1/1 n-butanol/acetic acid/water solvent system. The alanine content was 6.33 millimoles as determined by an amino acid analyzer.

From another portion of the afore-mentioned residue, the carboxylic acid present was isolated by means of an anionic exchange resin (Amberlite IR-45). It was found to contain a peptide bond by means of the biuret reaction (copper sulfate in an alkaline medium).

EXAMPLE 5

When 34 millimoles acetaldehyde and 29 millimoles phthalylglycine amide were reacted in the manner of Example 4, the hydrolysis mixture contained 3.6 millimoles alanine, and 4.8 millimoles alanine were found in the hydrolysis mixture obtained after reaction of 50 millimoles each of acetaldehyde and carbobenzoxyaspartic acid amide.

EXAMPLE 6

The pressure vessel referred to above was charged with 1.5 g. (50 millimoles) paraformaldehyde, 3.0 g. (50 millimoles) acetamide, 300 mg. dicobalt octacarbonyl, and 50 ml. dioxane, followed by a 3:1 mixture of carbon monoxide and hydrogen to a pressure of 300 kg./cm.$^2$. The reaction mixture was stirred at 120° C. for 20 minutes, whereby 52 millimoles gas were absorbed. The reaction product was a clear, yellowish-brown liquid which contained 11 milliequivalents of carboxylic acid, as determined by titration.

After removal of the solvent, the resindue was hydrolyzed with hydrochloric acid as above. The hydrolyzate was analyzed by means of an amino acid analyzer and was found to contain 16.9 millimoles glycine corresponding to a 45.7% yield based on the acetamide consumed.

EXAMPLE 7

3.8 g. (50 millimoles) formaldehyde dimethyl acetal, 3.0 g. (50 milimoles) acetamide, 300 mg. dicobalt octacarbonyl, and 50 ml. dioxane were placed in the aforementioned pressure vessel which was then charged with a 3:1 mixture of carbon monoxide and hydrogen to a pressure of 200 kg./cm.$^2$. The mixture in the sealed reactor was stirred at 120° C. for 60 minutes, whereby 76 millimoles gas were absorbed. The reaction mixture, a yellowish-brown, clear liquid, contained 13.3 milliequivalents of carboxylic acid.

The solvent was distilled off, the residue was hydrolyzed with 8 N hydrochloric acid in three hours, and the hydrolyzation mixture was fed to an amino acid analyzer which found 13.7 millimoles glycine, corresponding to a 72.5% yield based on the consumed acetamide.

EXAMPLE 8

The pressure vessel was charged with 2.2 g. (50 millimoles) acetaldehyde, 4.3 g. (50 millimoles) N-ethylacetamide, 300 mg. dicobalt octacarbonyl, 50 ml. ethyl acetate, and enough of a 3:1 mixture of carbon monoxide and hydrogen to raise the gas pressure to 200 kg./cm.$^2$. The contents of the vessel were stirred at 120°–140° C. for 45 minutes, whereby 32.8 millimoles gas were absorbed. The clear, faintly green reaction mixture contained 30.5 milliequivalents carboxylic acid.

Upon partial evaporation and cooling of the reaction mixture, a crystalline precipitate was formed. After recrystallization from ethyl acetate, the product melted at 100°–112° C. and was identified as N-ethyl-acetylalanine by its infrared spectrum, NMR spectrum, and by elementary analysis.

EXAMPLE 9

The same pressure vessel was charged with 1.54 g. (33.8 millimoles) acetaldehyde, 3.78 g. succinamic acid, 300 mg. dicobalt octacarbonyl, 40 ml. ethyl acetate, and enough of a 3:1 mixture of carbon monoxide and hydrogen to raise the pressure to 200 kg./cm.$^2$. The contents of the vessel were stirred at 150°–160° C. for 30 minutes, whereby 22.4 millimole gas were absorbed. The reaction mixture was yellowish-brown.

It was hydrolyzed as described above, and alanine was identified in the hydrolyzation mixture by means of a paper chromatogram. The alanine content was found to be 1.0 millimole by means of an amino acid analyzer.

EXAMPLE 10

The pressure vessel was charged with 4.30 g. (50 millimoles) methyl acrylate, 300 mg. dicobalt octacarbonyl, 50 ml. ethyl acetate, and enough of a mixture of equal volumes of carbon monoxide and hydrogen to raise the pressure to 200 kg./cm.$^2$. The mixture in the vessel was stirred at 120° C. for 30 minutes, whereby 80.1 millimoles gas were absorbed.

3.0 g. acetamide were added to the hydroformylation mixture so obtained, and the vessel was sealed again and brought to 200 kg./cm.$^2$ with a 3:1 mixture of carbon monoxide and hydrogen. The contents of the vessel were stirred thereafter at 140° C. for 60 minutes and 38.9 millimoles gas were absorbed. The product so obtained was of reddish-brown color and clear, and it contained 39.1 milliequivalents of carboxylic acid.

The solvent was removed by distillation, and the residuce was hydrolyzed with strong hydrochloric acid as above. Glutamic acid was identified in the hydrolyzate by means of paper chromatography, and an amino acid analyzer found 29.8 millimoles glutamic acid and 3.9 millimoles β-methylaspartic acid.

EXAMPLE 11

The pressure vessel described above was charged with 5.10 g. (50 millimoles) acetic anhydride, 3.8 g. (50 millimoles) acetamide, 300 mg. dicobalt octacarbonyl, 50 ml. acetone, and enough of equal volumes of carbon monoxide and hydrogen to raise the gas pressure to 200 kg./cm.$^2$. The contents of the vessel were stirred for 30 minutes at 130° C., whereby 45.3 millimoles gas were absorbed.

The solvent was removed from the faintly yellow, clear reaction mixture, and the residue was hydrolyzed with 8 N hydrochloric acid in three hours. 12.3 millimoles alanine were found in the hydrolysis mixture by means of an amino acid analyzer.

EXAMPLE 12

The pressure vessel was charged with 6.0 g. (50 millimoles) styrene oxide (epoxyethylbenzene), 300 mg. dicobalt octacarbonyl, 50 ml. dioxane, and equal volumes of carbon monoxide and hydrogen to raise the gas pressure to 200 kg./cm.$^2$. The contents of the vessel were stirred at 140° C. for 110 minutes, whereby 54.5 millimoles gas were absorbed. The dark red, clear reaction mixture contained 20 milliequivalents carboxylic acid, as determined by titration.

The dioxane was removed, the residue was dissolved in ethyl acetate, and the solution was extracted with an aqueous sodium carbonate solution (pH 8). The water layer was acidified to pH 2 with sulfuric acid and extracted with fresh ethyl acetate.

The ethyl acetate was evaporated, and the residue was dissolved in water, the solution was treated with active carbon and partly evaporated to precipitate crystals melting at 148° C.–151.5° C. which were identified as N-acetylphenylalanine by their infrared spectrum and elementary analysis.

EXAMPLE 13

The pressure vessel was charged with 2.0 g. (50 millimoles) acetonitrile, 5.0 g. (50 millimoles) acetic anhydride, 50 ml. glacial acetic acid, and enough of a 3:1 mixture of carbon monoxide and hydrogen to raise the pressure to 200 kg./cm.$^2$. The contents of the vessel were stirred at 190° C. for 80 minutes, whereby 98.2 millimoles gas were absorbed.

The reaction mixture was clear and had a dark, reddish-brown color. The solvent was removed, and the residue was hydrolyzed as described above. 7.4 millimoles α-alanine were found in the hydrolyzate by means of an amino acid analyzer.

EXAMPLE 14

The reaction vessel was charged with 5.0 g. (50 millimoles) diacetamide, 300 mg. dicobalt octacarbonyl, 50 ml. acetic anhydride, and equal volumes of carbon monoxide and hydrogen to raise the pressure to 200 kg./cm.$^2$. The contents of the vessel were stirred at 130° C. for 90 minutes, whereby 179.6 millimoles gas were absorbed.

The reaction mixture was brown and semi-transparent. The solvent was removed, and the residue was hydrolyzed as described above. Alanine was identified in the hydrolyzate in a paper chromatogram developed by means of butanol/acetic acid/water 4/1/1. $R_f$ value 0.3.

EXAMPLE 15

The pressure vessel was charged with 5.2 g. (50 millimoles) β-methylmercaptopropionaldehyde, 3.0 g. (50 millimoles) acetamide, 300 mg. dicobalt octacarbonyl, 2.6 g. methanol, 50 ml. benzene, and a 3:1 mixture of carbon monoxide and hydrogen gas to raise the pressure to 200 kg./cm.$^2$. The contents of the vessel were stirred at 120° C. for 35 minutes, whereby 36.8 millimoles gas were absorbed. The reaction mixture had a faint, yellowish-brown color, and was found by titration to contain 17.3 milliequivalents of carboxylic acid.

The presence of 17.4 millimoles N-acetylmethionine was determined by microbioassay. A portion of the reaction mixture was hydrolyzed with 8 N hydrochloric acid, and methionine was found by bioassay in the hydrolyzate corresponding to 18.3 millimoles in the entire reaction mixture.

Another portion of the reaction mixture was stripped of solvent in a vacuum, and the residue was treated with an anion exchange resin (Amberlite IR-45) to collect the carboxylic acids present. The effluent was found by microbioassay to contain neither N-acetylmethionine nor methionine and was hydrolyzed by means of 8 N hydrochloric acid. The hydrolysis mixture was found to contain 2.12 millimoles methionine. The infrared spectrum of the reaction mixture showed the characteristic absorption peak of an ester at 1725 cm.$^{-1}$.

EXAMPLE 16

The pressure vessel was charged with 2.2 g. (50 millimoles) acetaldehyde, 3.0 g. (50 millimoles) acetamide, 420 mg. cobalt acetate, 50 ml. acetic acid, and enough of a 3:1 mixture of carbon monoxide and hydrogen to bring the gas pressure to 200 kg./cm.$^2$. The contents of the vessel were stirred at 140° C. for 60 minutes, whereby 56.2 millimoles gas were absorbed. The reaction mixture, which was brownish and clear, contained 49.3 milliequivalents carboxylic acid.

The solvent was evaporated in a vacuum, and the residue was hydrolyzed with 8 N hydrochloric acid in three hours. It contained 35 millimoles alanine, as determined by an amino acid analyzer.

EXAMPLE 17

6.8 g. (20 millimoles) dicobalt octacarbonyl and 50 ml. acetone were placed in a Schlenk tube under a protective atmosphere of flowing nitrogen. 7 g. (160 millimoles) acetaldehyde, 9.4 g. (160 millimoles) acetamide, and 5.7 g. concentrated hydrochloric acid were added. After standing at room temperature for 41 hours, the reaction mixture was evaporated, and the residue was hydrolyzed with 8 N hydrochloric acid in three hours. Alanine was identified in a paper chromatogram of the hydrolyzate, and 10.3 millimoles alanine were found by an amino acid analyzer, corresponding to a 50% yield based on the dicobalt octacarbonyl.

EXAMPLE 18

The afore-mentioned pressure vessel was charged with 2.2 g. (50 millimoles) acetaldehyde, 3.0 g. (50 millimoles) acetamide, 93.3 millimoles palladium dichloride, 0.2 ml. concentrated hydrochloric acid, 50 ml. ethyl acetate, and enough of a 3:1 mixture of carbon monoxide and hydrogen to raise the gas pressure in the vessel to 200 kg./cm.$^2$.

The material in the vessel was stirred for 20 minutes at 160° C. The reaction mixture so obtained was clear and faintly yellow and contained 13 milliequivalents of carboxylic acid.

The solvent was evaporated, and the residue was hydrolyzed with 8 N hydrochloric acid in three hours. It contained 2.1 millimoles alanine as determined by means of an amino acid analyzer.

EXAMPLE 19

The pressure vessel was charged with 2.2 g. (50 millimoles) acetaldehyde, 3.0 g. (50 millimoles) acetamide, 300 mg. dicobalt octacarbonyl, 50 ml. acetic acid, and carbon monoxide to a pressure of 150 kg./cm.$^2$. The contents of the vessel were heated to 140° C. for 50 minutes, whereby 31.6 millimols carbon monoxide were absorbed. The reaction mixture so obtained was brown and clear.

The solvent was removed, and the residue was hydrolyzed as described above. The hydrolyzate was treated wtih bis(trimethylsilyl)acetamide and was then analyzed by quantitative gas chromatography. 25.2 millimoles of alanine were found corresponding to a 75.7% yield based on the consumed acetamide.

While the invention has been described with particular reference to specific embodiments, it is to be understood that it is not limited thereto, but is to be construed broadly and restricted solely by the scope of the appended claims.

What is claimed is:

1. A method of producing an N-acyl-α-amino acid which comprises holding an aldehyde, an amide of a carboxylic acid, and carbon monoxide at a temperature of 10° to 300° C. and at a pressure between atmospheric pressure and 500 atmospheres in the presence of a carbonylation catalyst until said N-acyl-α-amino acid is formed by condensation of one mole equivalent each of said amide, said aldehyde, and said carbon monoxide, said aldehyde having a formyl group bound to hydrogen or to saturated carbon, said amide having a carbamoyl group including at least one active hydrogen attached to the nitrogen thereof, and said carbonylation catalyst containing, as the principal active agent, a transition element of the iron group or of the platinum group.

2. A method as set forth in claim 1, wherein hydrogen gas is admixed to said carbon monoxide gas.

3. A method as set forth in claim 1, wherein said aldehyde and said amide are dispersed in a liquid inert diluent while being held at said temperature and pressure.

4. A method as set forth in claim 3, wherein said temperature is 50° to 200° C. and said pressure is 10 to 500 atmospheres.

5. A method as set forth in claim 1, wherein a metallic carbonyl is used as a source of said carbon monoxide and as said catalyst.

6. The method as set forth in claim 1 wherein the aldehyde is acetaldehyde, the amide is acetamide and the catalyst is dicobalt octacarbonyl.

(References on following page)

References Cited

FOREIGN PATENTS 1,034,298   6/1966   Great Britain _____ 260—455 A

OTHER REFERENCES

Decombe: "The Condensation of Chloral With Acetanilide, etc." (1953), CA48, p. 10022 (1954).

Imyanitov et al.: "Amide Synthesis" (1969), CA71, No. 70138r (1969).

Wakamatsu: "Hydroformylation of Simple Olefins, etc." (1964), CA61, p. 13173 (1964).

Chalk et al.: "Catalysis by Cobalt Carbonyls" (1968), vol. 6, Advances in Organometallic Chem.—AP, New York, pp. 157–63 (1968).

G. H. HOLLRAH, Primary Examiner

U.S. Cl. X.R.

260—326.12, 326.14, 326.3, 347.2, 347.3, 404, 404.5, 481 R, 482 R, 514 R, 518 R, 534 R, 534 E, 534 G, 534 M, 534 S